S. C. ATTAWAY.
DISK PLOW.
APPLICATION FILED SEPT. 2, 1921.
1,421,371. Patented July 4, 1922.
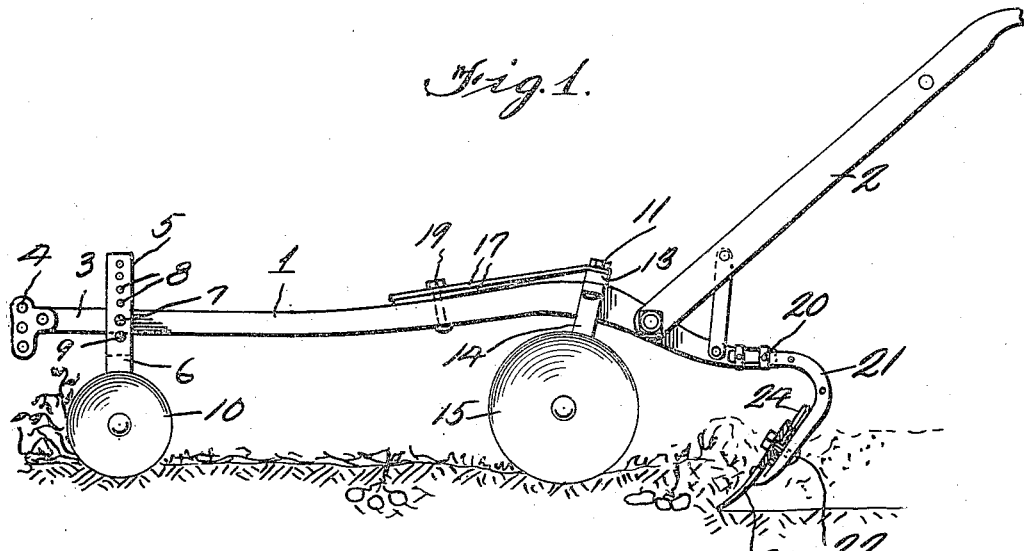
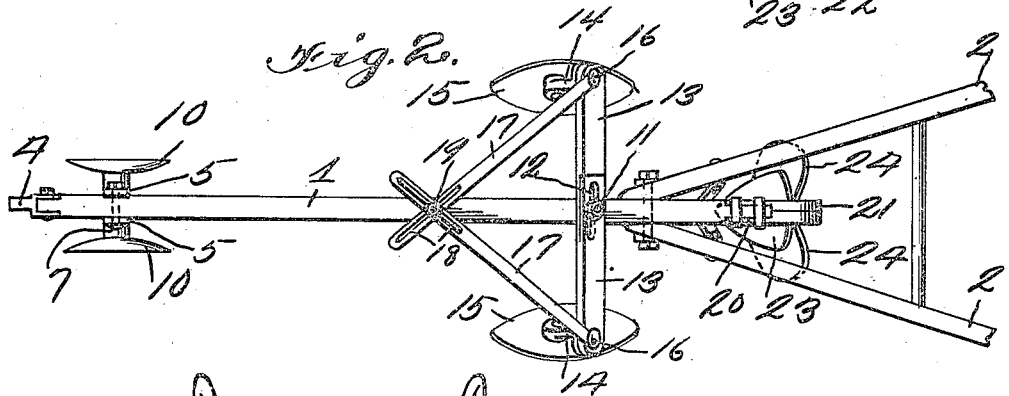
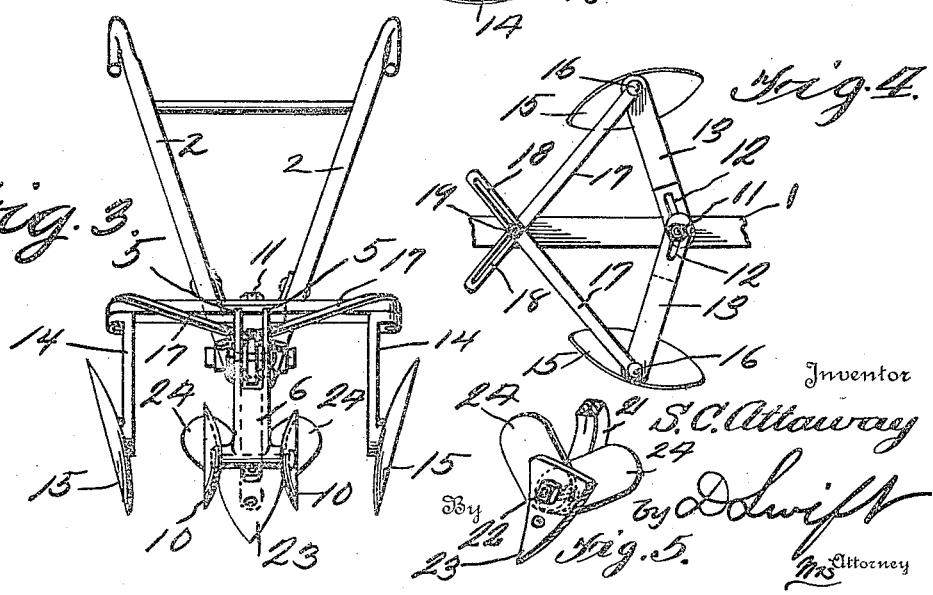
Inventor
S. C. Attaway
By D. Swift
Attorney

UNITED STATES PATENT OFFICE.

SIDENEY CICERO ATTAWAY, OF THOMASVILLE, GEORGIA.

DISK PLOW.

1,421,371. Specification of Letters Patent. Patented July 4, 1922.

Application filed September 2, 1921. Serial No. 497,831.

*To all whom it may concern:*

Be it known that I, SIDENEY CICERO ATTAWAY, a citizen of the United States, residing at Thomasville, in the county of Thomas, State of Georgia, have invented a new and useful Disk Plow; and I do hereby declare the following to be a full, clear, and exact description of the invention, such as will enable others skilled in the art to which it appertains to make and use the same.

The invention relates to disk plows, and has for its object to provide a device of this character adapted to straddle a row of potatoes and provided with spaced disks adjacent its forward end for cutting potato vines and disks located rearwardly of said vine cutting disks for barring off the row of potatoes and a plowing element located rearwardly of the barring off disks and forming means for plowing up potatoes.

A further object is to provide means whereby the barring off disks may be adjusted inwardly or outwardly in relation to each other so that the row of potatoes may be barred off to a desired width.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the plow.
Figure 2 is a top plan view of the plow.
Figure 3 is front elevation.
Figure 4 is a detail view showing the rear disks adjusted in relation to each other.
Figure 5 is a perspective view of the adjustable plowing element.

Referring to the drawings, the numeral 1 designates a conventional form of plow beam and 2 rearwardly and upwardly extending handles adapted to be grasped by the operator during a plowing operation. The forward end 3 of the plow beam 1 is provided with a conventional form of clevis 4 to which draft animals may be attached.

The forward end 3 of the plow beam 1 is disposed between spaced arms 5 of a disk carrying standard 6 and held on the beam in various positions to which it may have been moved by means of a bolt 7 which passes through any of the registering apertures 8 and a pin 9 may be placed through the registering apertures below the lower edges of the beam 1 for preventing backward or forward movement of the standard 6. The lower end of the standard 6 is provided with vine cutting disks 10, which disks sever the potato vines before the barring and plowing operation which follows. Pivotally mounted to the beam 1 adjacent its rear end on a bolt 11 which extends through elongated slots 12 thereof, are outwardly extending arms 13, said arms being provided with downwardly extending arms 14, to which arms are secured disks 15 which bar off the row immediately following the vine cutting operation of the disks 10. Pivotally connected at 16 to the outer ends of the outwardly extending arms 13 are forwardly and inwardly extending braces 17, the inner ends of which are crossed as shown in Figure 4, and are provided with elongated slots 18 through which a securing bolt 19 extends. It will be seen that the disks 15 may be adjusted outwardly and inwardly in relation to each other for barring off the row at any desired width. Secured at 20 to the rear end of the plow beam 1 is a rearwardly and downwardly extending plow foot 21, to the lower end of which is secured by means of a bolt 22, the pointed body 23 and the adjustable wings 24 of a shovel, which shovel after the barring off operation digs the potatoes so that they may be easily and quickly harvested in any manner desired.

From the above it will be seen that a combined potato digging and vine cutting plow is provided which is simple in construction, and so constructed that the vine cutting disks 10 may be adjusted upwardly or downwardly as desired, and row barring disks 15 adjusted outwardly and inwardly in relation to each other and may be angularly disposed in relation to each other thereby allowing the row to be barred off as desired.

The invention having been set forth what is claimed as new and useful is:—

1. A vine cutting and potato digging plow, said plow comprising a beam, spaced vine cutting disks adjacent the forward end of the beam, spaced barring disks disposed rearwardly of the vine cutting disks and a digging plow carried by the beam rearwardly of the barring disks and centrally in relation thereto.

2. A vine cutting and potato digging plow, said plow comprising a beam, a standard carried adjacent the forward end of said beam and vertically adjustable thereon, said standard having its lower end provided with vine cutting disks, barring disks disposed rearwardly of the vine cutting disks, said barring disks being carried by outwardly and inwardly adjustable supporting arms, said arms having their inner ends overlapped and connected to the beam by a bolt extending through registering slots therein, brace arms pivoted to the outer ends of said supporting arms and extending forwardly and having their ends crossed at a point above the beam, a bolt extending through registering slots of the crossed ends of the braces and forming means for securely clamping the braces to the beam and a plowing element disposed rearwardly of the barring disks, said plowing element being centrally disposed in relation to the disks.

3. A combined vine cutting, row barring and potato digging plow, said plow comprising a beam, spaced vine cutting disks adjacent the forward end of said beam, row barring spaced disks disposed rearwardly of the vine cutting disks and a plowing element disposed rearwardly of the row barring disks.

In testimony whereof I have signed my name to this specification in the presence of two subscribing witnesses.

SIDENEY CICERO ATTAWAY.

Witnesses:
J. B. Carow,
B. B. Earle.